Oct. 12, 1971  TOSHIYA YAMAMOTO  3,611,610
WATERTIGHT FLOATING BOXES USING WATERTIGHT DOORS
Filed Sept. 10, 1969  3 Sheets-Sheet 3

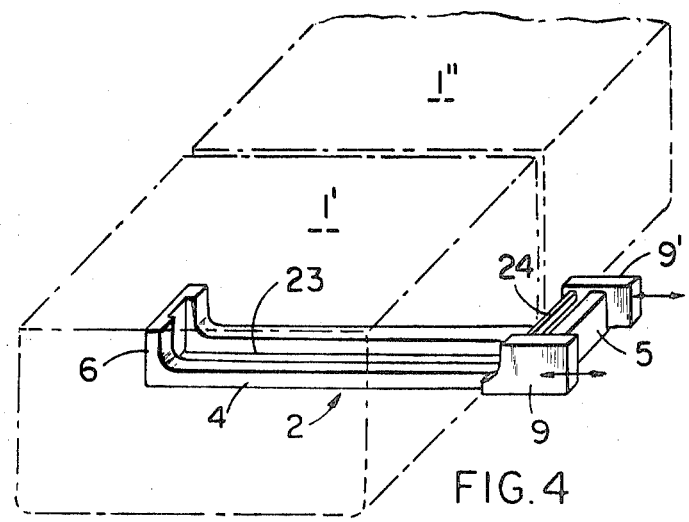
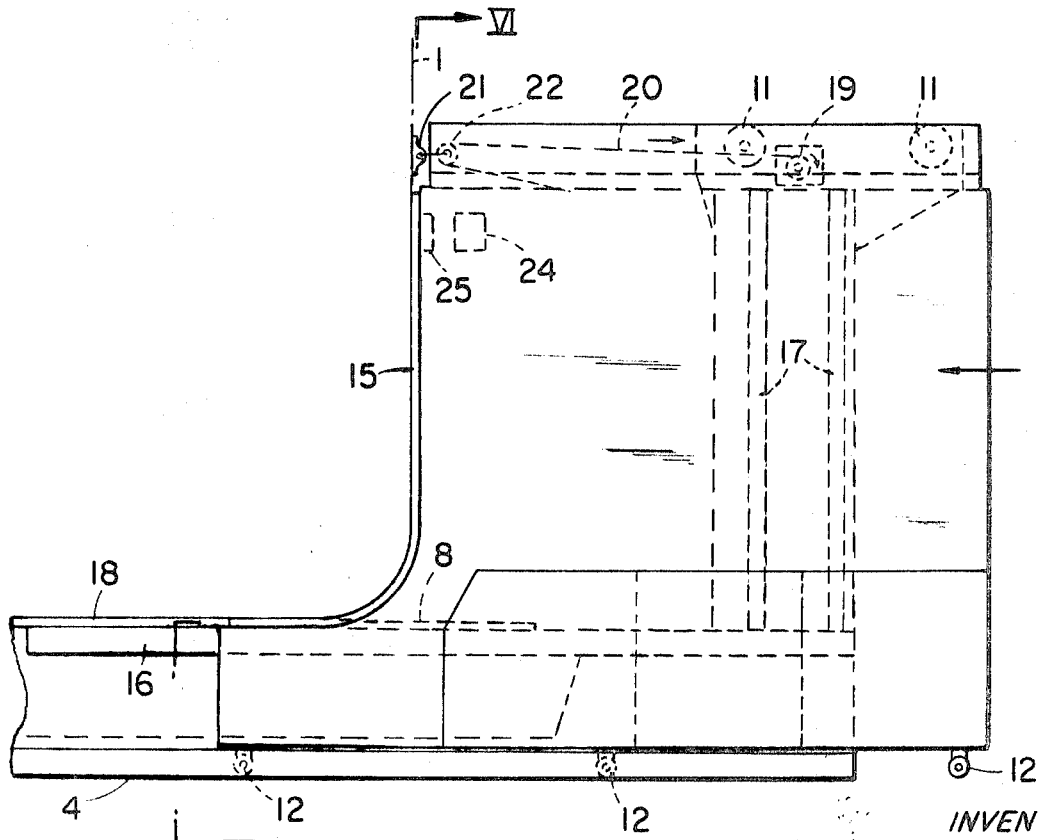

INVENTOR
Toshiya Yamamoto by McGlew & Toren
ATTORNEYS

United States Patent Office 3,611,610
Patented Oct. 12, 1971

3,611,610
WATERTIGHT FLOATING BOXES USING WATERTIGHT DOORS
Toshiya Yamamoto, Nagasaki, Japan, assignor to Mitsubishi Jukogyo Kabushiki Kaisha, Tokyo, Japan
Filed Sept. 10, 1969, Ser. No. 856,558
Claims priority, application Japan, Sept. 25, 1968, 43/69,280
Int. Cl. B63b *3/04, 9/00*
U.S. Cl. 114—77                                    8 Claims

ABSTRACT OF THE DISCLOSURE

A watertight floating box, for use in working on submerged surfaces of floating bodies, such as ship hulls, comprises a caisson assembly arranged to enclose, in watertight fashion, the submerged surfaces upon which work is to be performed and to be pumped free of water to provide a dry working space along the work surfaces. The caisson assembly includes a bottom structure extending horizontally and transversely beneath the floating body and having a length in excess of the beam of the floating body, side wall structures adjacent respective opposite ends of the bottom structure and extending upwardly along the adjacent sides of the floating body, and door members slidable transversely of the floating body to seal off any gaps between the side wall structures and the floating body.

BACKGROUND OF THE INVENTION

In recent years, the great economy in operation combined with the great strides made in shipbuilding technology has given rise to a trend to larger and bulkier ships, so that the shipping world now faces a demand for very large vessels, for example vessels having dead-weight capacities of as much as 300,000 to 500,000 tons.

Nevertheless, most of the existing shipbuilding ways and docks in shipyards in Japan and elsewhere in the world are not capable of building or repairing such large ships. Of course, the existing shipbuilding ways or docks could be expanded, but such expansion involves a great deal of expense and time and, in some cases, it is not justified by the geographical conditions of the shipyard.

For this reason, in the construction of ships of sizes beyond the capacities of the relatively small available shipbuilding ways or docks, the so-called "uniting-afloat" method has been proposed. In this method, a hull is built in two or more sections of suitable dimensions on available shipbuilding ways or docks. The sections are then launched separately after which they are welded or otherwise united while afloat.

Of the problems involved in the "uniting-afloat" method, in which the floating sections naturally are partly submerged due to their own weight, the knottiest is how to unite the submerged portions of the separately launched sections safely and with full reliability as to structural strength. In an attempt at solving this problem, it has been proposed to cover the submerged portions of the sections to be united in a watertight fashion with a box-like structure such as a caisson having a U-shaped cross section. This caisson is then pumped out to provide a dry space adjacent the surfaces upon which work is to be performed, and workers can do their jobs in these dry spaces. Such jobs include, for example, joining of the split or separate sections together and inspection of the united sections from the outside of the hull.

Conventional watertight floating boxes have fixed widths, and therefore each size of watertight floating box can be reused only with ships of the same over-all beam, but not with ships or floating bodies having different beams. Where several vessels having respectively different transverse dimensions are to be built, individual watertight boxes of the corresponding dimensions must be fabricated with considerable inconvenience and at considerable economical disadvantage. Since such a box is fabricated in advance to a width in complete agreement with the over-all beam of the vessel with which it is to be used, almost no space is provided between the side walls of the box and the side platings of the hull, and this renders it difficult to fit the box to the hull and to remove it therefrom.

SUMMARY OF THE INVENTION

This invention relates to watertight floating boxes for use in working on the submerged surfaces of floating bodies and, more particularly, to a novel and improved watertight floating box including door members slidable transversely of the floating body to seal off any gap between side wall structures of the floating box and the sides of the floating body.

In accordance with the present invention, the foregoing disadvantages of conventional watertight floating box are obviated, and watertight floating boxes are provided of a type which can be used with floating bodies of various widths or beams. In addition, the floating boxes are easy to attach to and detach from the floating bodies, such as ship hulls and the like.

More particularly, the present invention provides watertight floating boxes including watertight doors, for use in working on the submerged surfaces of floating bodies during uniting, dividing, repairing, or maintaining the floating body. A watertight floating box, in accordance with the invention, is constructed as a watertight caisson assembly comprising a bottom structure extending horizontally and transversely of the bottom of the floating body and side wall structures extending vertically upwardly in facing relation with the side walls of the floating body. The caisson assembly is adapted to cover, in watertight fashion, the submerged portions or sections of the floating body upon which work is to be performed, and is arranged to be pumped free of water to provide a dry working space along the work surfaces. In particular accord with the invention, the watertight floating box has a width somewhat larger than that of the floating body, and the gaps between the side walls of the floating body and the side wall structures of the floating object are covered with watertight doors which are slidable transversely of the floating body.

An object of the invention is to provide and improve the watertight floating box for use in working on the submerged surfaces of floating bodies such as ship hulls.

Another object of the invention is to provide such a watertight floating box which is readily and easily usable with floating bodies having various widths and beams.

A further object of the invention is to provide such a watertight floating box including door members slidable transversely of the floating body to seal off any gaps between side wall structures of the floating box and the side plates of the floating body.

Another object of the invention is to provide such a watertight floating box including sealing gaskets arranged on the caisson assembly and on the sliding doors.

For an understanding of the principles of the invention, reference is made to the following description of typical embodiments thereof as illustrated in the accompanying drawings.

BRIEF DESCRIPTION OF THE DRAWINGS

In the drawings:

FIG. 4 is a perspective view of the box as applied to a floating body;

FIG. 5 is an enlarged partial front elevation view of the box, illustrating the watertight doors and associated parts of the floating box;

DESCRIPTION OF THE PREFERRED EMBODIMENTS

Figure 1:
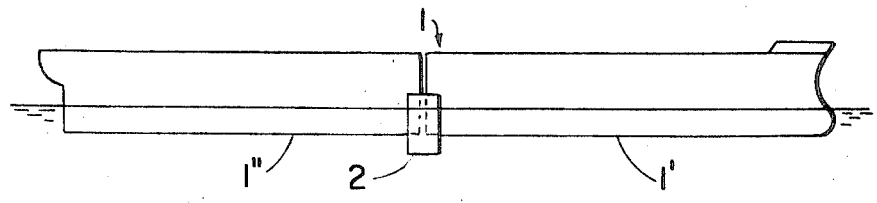
FIG. 1 is a side elevation view of the watertight floating box embodying the invention as attached to the hull of a ship.

In FIGS. 1 through 6, reference 1 indicates a hull comprising two sections, such as a fore-body 1' and an after-body 1", the sections having been constructed on conventional shipbuilding ways of relatively small size and having been launched separately to be united subsequently while afloat. A watertight floating box embodying the invention is illustrated at 2 as comprising a U-shaped caission having internal dimensions greater than the width of the sections of hull 1. Box 2 has a plurality of ballast tanks 3 which may controllably have water. ballast pumped thereinto or pumped therefrom to maintain watertight floating box 2 at its proper draft and trim in the manner of a small floating dock.

Watertight floating box 2 generally comprises a bottom structure 4 which extends horizontally and transversely along the bottom of the hull, and respective side wall structures 5 and 6 which extend upwardly near the opposite ends of bottom structure 4 and face the side strakes of the hull. Of the side wall structures 5 and 6, side wall structure 5 is so constructed that the opposite sides 7 and 7' thereof are flush with the adjacent opposite sides 8 and 8' of bottom structure 4. Watertight doors 9 and 9' are provided to close the gaps 10 formed between hull 1 and side wall 5 as watertight box 2 is attached to hull 1.

Doors 9 and 9' are slidable transversely of the ship through the medium of pairs of guide rollers 11, 11' and 12, 12' provided between side wall structure 5 and bottom structure 4, respectively. Guide rollers 11 and 11' on side wall structure 5 are mounted for limited vertical displacement by means of hydraulic actuators 13, 13' or the like, so that the positions of watertight doors 9 and 9' can be adjusted vertically to a limited extent. The outer surfaces of watertight doors 9 and 9' have attached thereto floats 14 and 14' which can either have ballast water pumped thereinto or pumped therefrom to regulate the buoyancy of watertight doors 9 and 9'. Alternatively, the doors 9 and 9' may have fixed ballasts attached thereto. The floats or the ballasts protect the pairs of guide rollers 11, 11' and 12, 12' from the very high loading involved as watertight doors 9 and 9' are slid along watertight box 2.

As indicated at 15 and 15', sheet packings are stretched over the edges of watertight doors 9 and 9', facing hull 1, and these serve to establish a watertight seal of doors 9 and 9' as they contact hull 1. Similarly, pairs of sheet packings 16 and 16' and 17, 17' are stretched over the side faces 8, 8' and 7, 7' of bottom structure 4 and side wall structure 5, respectively. Watertight doors 9 and 9' are brought into contact with sheet packings 16, 16' and 17, 17'. Of these packings, the packings 16, 16' on bottom structure 4 are connected with matching packings 18, 18' of the hull, and which are provided along the over-all lengths of bottom structure 4 and side structure 6. Winches 19 and 19' are mounted on the unsubmerged, or above water, portions of the side wall structure 5 for the purpose of moving watertight doors 9 and 9'. The ends of wires 20 and 20' extending from winches 19 and 19' are connected to watertight doors 9 and 9' through guide pulleys 22 and 22' on eye plates tacked to the outside plating, at points above the water line, of hull 1.

Solely by way of example, the use of watertight floating box 2 in uniting two hull sections built on conventional shipbuilding ways and launched separately, while the sections are afloat, will now be described. With watertight floating box 2 afloat, ballast tanks 3 have water controllably pumped thereinto or pumped therefrom to submerge box 2 to a desired draft. Box 2 is moved by a tug boat, for example, to a position immediately below that portion of fore-body 1' to be joined with after-body 1" of hull 1. Following this, after-body 1" is moved, as by towing, with ballast tanks in this hull section suitably filled with ballast water or suitably emptied of ballast water, to a position where the portion of after-body 1" to be united with fore-body 1' is matched with the mating portion of fore-body 1', as shown in FIG. 1.

Figure 2:
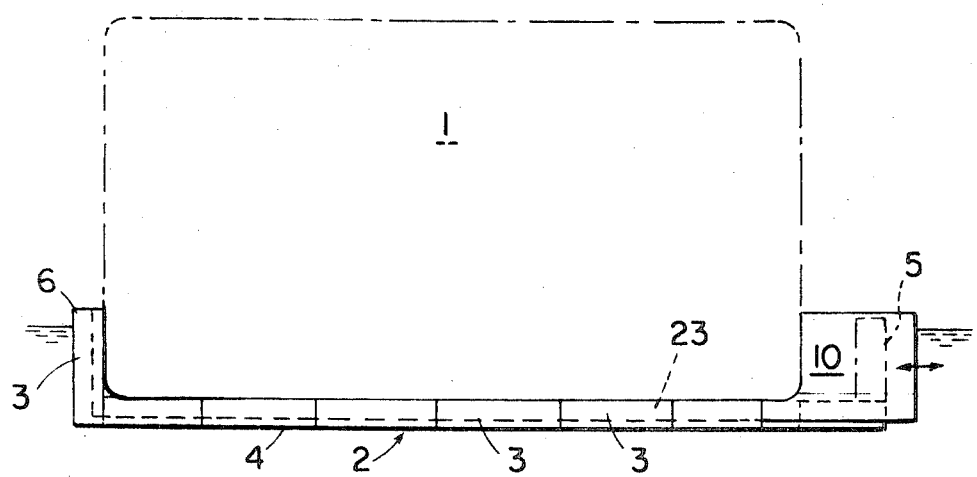
FIG. 2 is a front end elevation of the watertight floating box.
Figure 3:
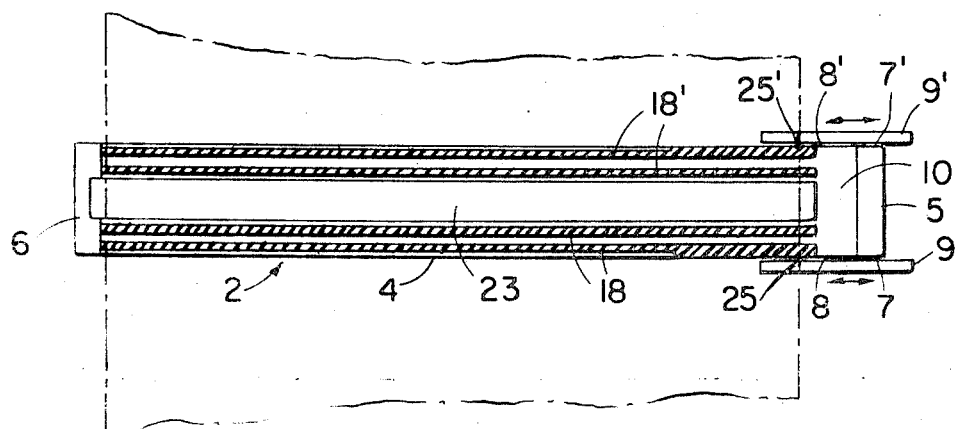
FIG. 3 is a top plan view, partly in section, of the watertight floating box.
Figure 6:
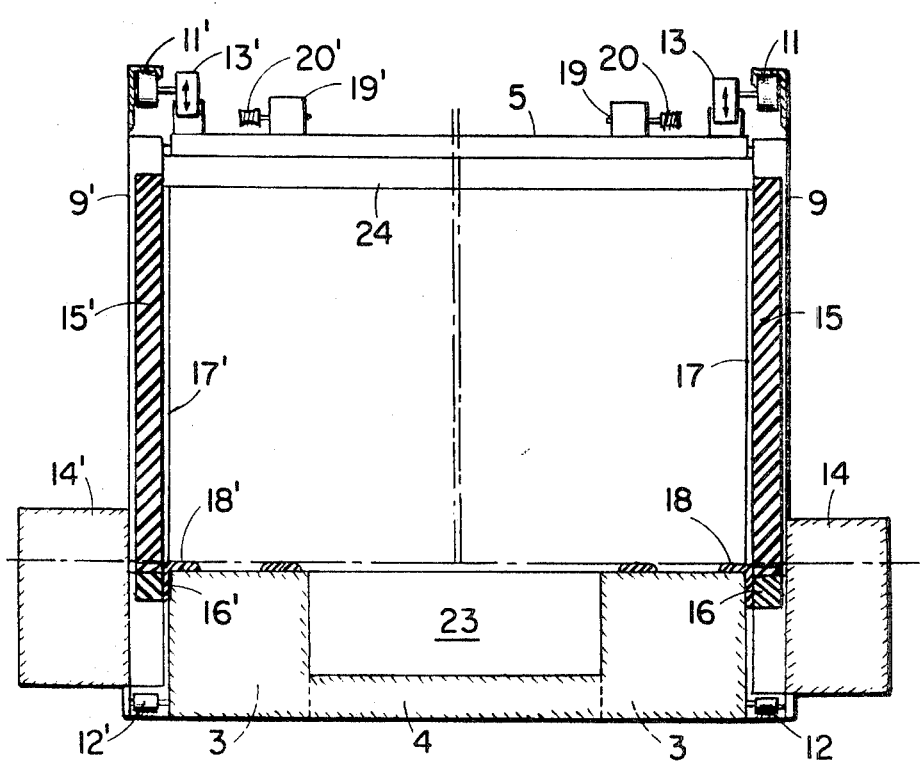
FIG. 6 is a sectional view taken along the line VI—VI of FIG. 5, looking in the direction of the arrows.

From this position, box 2, as a unit, is moved to the right, as viewed in FIG. 2, by a tug boat or the like, while ballast tanks 3 of watertight box 2 are gradually pumped free of water until box 2 floats up and bottom structure 4 and side wall structure 6 are pressed against the outside plating of hull 1 with the interposition of packings 18 and 18'. Thereupon, winches 19 and 19' are started to move watertight doors 9 and 9' toward hull 1 until the edges of the doors facing the hull are pressed against the hull with the interposition of sheet packings 15 and 15'. At this time, the vertical positions of watertight doors 9 and 9' are adjusted, if necessary, through the medium of guide rollers 11 and 11' equipped with the hydraulic jacks 13 and 13'. On completion of these adjustments, watertight doors 9 and 9' and side wall structure 5 may be secured together with bolts or the like to provide safely against possible relative movement.

Water is then pumped out of watertight floating box 2 and, as the pumping operation proceeds, the difference between the internal and external water pressures causes watertight doors 9 and 9' to be pressed in a watertight manner against side faces 7, 7' and 8, 8', respectively, of side wall 5 and bottom structure 4 with the interposition of packings 17 and 17' and 16, 16'. As the pumping proceeds further, a dry working space 23 is produced between hull 1 and watertight box 2. From then on, workers can enter the space and perform therein the uniting of the hull sections and the inspection of the united sections in a safe and secure manner.

To avoid deflection of doors 9 and 9' due to the external water pressure, a reinforcing beam 24 desirably is provided between doors 9 and 9' adjacent the outside plating of hull 1. In some cases, support boxes 25 and 25' may be temporarily provided on the outside plating, instead of providing the reinforcing beam 24.

The embodiment of the watertight floating box just described can be adjusted to a width corresponding to the beam of the ship by moving watertight doors 9 and 9'. Therefore, the same watertight box can be used repeatedly with vessels of various sizes having different beams.

Winches 19, 19', hydraulic actuators 13, 13', and associated parts for moving watertight doors 9 and 9' do not need any waterproofing or any anti-rust treatments or protections, and are easy to handle because they are mounted on portions of side wall structure 5 which are above the water level. In addition, in this embodiment, doors 9 and 9' are arranged to contact side wall structure 5 and bottom structure 6 at the same level and thereby stresses on hull 1 and on box 2 can be advantageously relieved at the respective watertight seal portions. Attachment of box 2 to hull 1, or detachment of box 2 from hull 1, can be carried out with ease, because adequate room is provided between the outside plating of the hull and side wall structures 5 and 6 of box 2 provided watertight doors 9 and 9' are retracted from hull 1.

Figure 7:
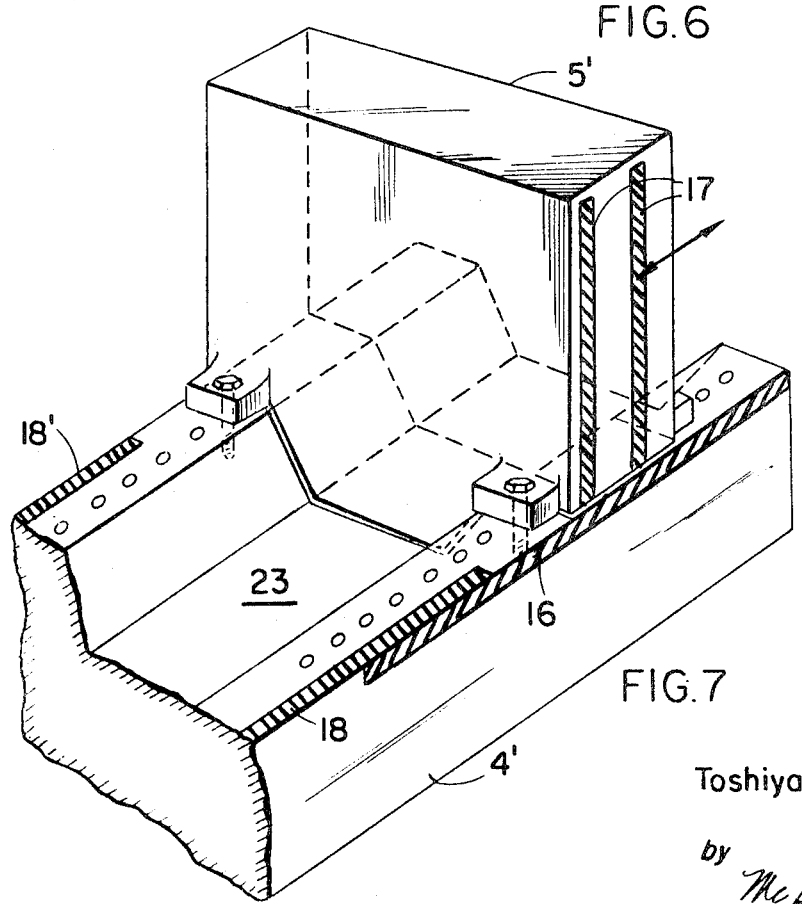
FIG. 7 is a partial sectional view of a side wall structure and related parts of another floating box embodying the invention.

Although, in the embodiments of the invention shown in FIGS. 1 through 6, the internal dimensions of box 2 are adjusted only by movement of watertight doors 9 and 9', the distance through which doors 9 and 9' can be moved has certain limits. If there is a possibility that the gap, between the internal dimension of box 2 and the beam of the ship with which it is used, be sufficiently large that it cannot be compensated by movement of watertight doors 9 and 9', a watertight box construction such as shown in FIG. 7 advantageously may be adopted. In the embodiment of the invention shown in FIG. 7, one of the side wall structures, such as the side wall structure 5', is fabricated as a unit independently of bottom structure 4'. The position of side wall structure 5', which is to be mounted on bottom structure 4', can be preset in accordance with the beam of the vessel or the width of the floating body with which the watertight floating box is to be used. If the proper positioning of side wall structure 5' is effected while the watertight floating box is afloat and before it is attached to the hull, movement of side wall structure 5' is facilitated and fixing thereof to bottom structure 4', as well as maintenance of the water seal at the fixed portions, are carried out easily and positively. Side wall structure 5' can be moved by a crane or other suitable means.

In summary, a watertight floating box in accordance with the invention has watertight doors for use in working on the under water portions of floating bodies, the box being constructed in the form of a caisson including a bottom structure, extending horizontally and transversely of the bottom of the floating body, and side wall structures extending upwardly adjacent both ends at the bottom structure and along the side surfaces of the floating body. This caisson structure or assembly is arranged to be pumped free of water to provide a dry working space along the work surfaces of the floating body.

The invention is characterized in that the watertight floating box is built, in advance, to have internal dimensions greater than the beam or width of the floating body on which work is to be performed. The gaps between side wall structures of the box and the floating body are sealed off with watertight doors which are slidable transversely of the floating body. If necessary, at least one side wall is made displaceable transversely of the floating body while the watertight floating box is afloat. Thus, a watertight floating box embodying the invention provides for the same box to be used in common with ships and other floating bodies of various beams or widths. The floating boxes advantageously are simple in construction, easy to handle, and capable of maintaining excellent watertightness.

While specific embodiments of the invention have been shown and described in detail to illustrate the application of the principles of the invention, it will be understood that the invention may be embodied otherwise without departing from such principles.

What is claimed is:

1. A watertight floating box, for use in working on the submerged surfaces of floating bodies, such as ship hulls, during uniting, dividing, repairing, or maintaining of the floating body, said watertight floating box comprising a caisson assembly arranged to enclose, in watertight fashion, the submerged surfaces upon which work is to be performed and to be pumped free of water to provide a dry working space along such work surfaces; said caisson assembly including an upwardly opening channel-shaped bottom structure extending horizontally and transversely beneath the floating body and having an interior length in excess of the beam of the floating body; said bottom structure forming a working chamber beneath the floating body to accommodate men working on said floating body; inwardly opening channel-shaped side wall structures on respective opposite ends of the bottom structure communicating therewith and extending upwardly along the adjacent sides of the floating body; at least one of said side wall structures comprising an upwardly extending wall mounted on said bottom structure and substantially parallel to the adjacent side of the floating body, and a pair of door members on respective opposite ends of said wall extending substantially perpendicular to the adjacent side of the floating body to define, with said wall, the inwardly opening channel-shaped structure; means mounting said door members on said caisson assembly for movement transversely of the floating body to engage the adjacent side of the floating body; and sealing means on the inner edges of said wall members engageable with the adjacent side wall of the floating body.

2. A watertight floating box, as claimed in claim 1, including sealing gaskets extending along all those surfaces of said bottom and side wall structures adjacent the surfaces of the floating body.

3. A watertight floating box, as claimed in claim 1, including ballast means attached to each of said door members to take up the weight of said door members during such transverse movement thereof.

4. A watertight floating box, as claimed in claim 1, in which said at least one side wall structure is adjustably displaceable transversely of the floating body while said watertight floating box is afloat.

5. A watertight floating box, as claimed in claim 1, including rollers supporting said door members on said upwardly extending wall and on said bottom structure.

6. A watertight floating box, as claimed in claim 5, in which said rollers include upper rollers mounted on said upwardly extending wall; and means operable to adjust said upper rollers vertically to effect limited vertical adjustment of said door members.

7. A watertight floating box, as claimed in claim 7, in which said bottom structure and said side structures define working spaces for workmen uniting, dividing, repairing, or maintaining the floating body.

8. A watertight floating box, as claimed in claim 1, including reinforcing means extending between and interconnecting the door members on respective opposite ends of said wall.

References Cited

UNITED STATES PATENTS

| | | | |
|---|---|---|---|
| 1,632,491 | 6/1927 | Matthiessen et al. | 114—46 |
| 2,360,690 | 10/1944 | Koulichkov | 61—68 |

MILTON BUCHLER, Primary Examiner

G. W. O'CONNOR, Assistant Examiner

U.S. Cl. X.R.

114—227